J. C. F. ATSATT.
DEVICE FOR AUTOMATICALLY REGULATING COMBUSTION IN HOT WATER AND HOT AIR HEATING APPARATUS.
No. 11,139. Reissued Jan. 13, 1891.
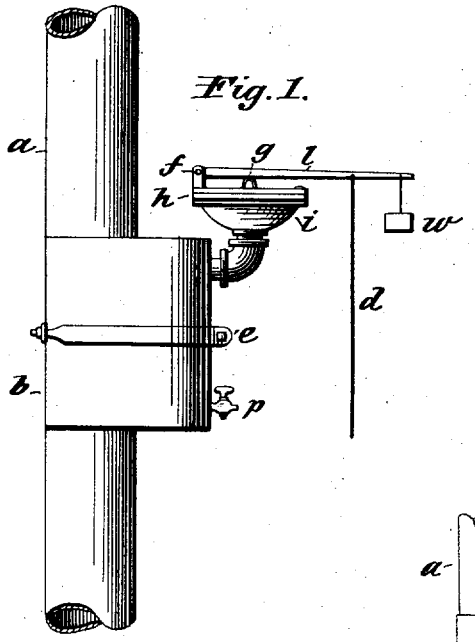
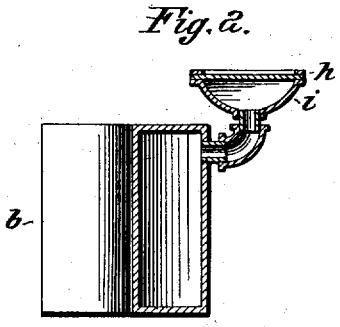
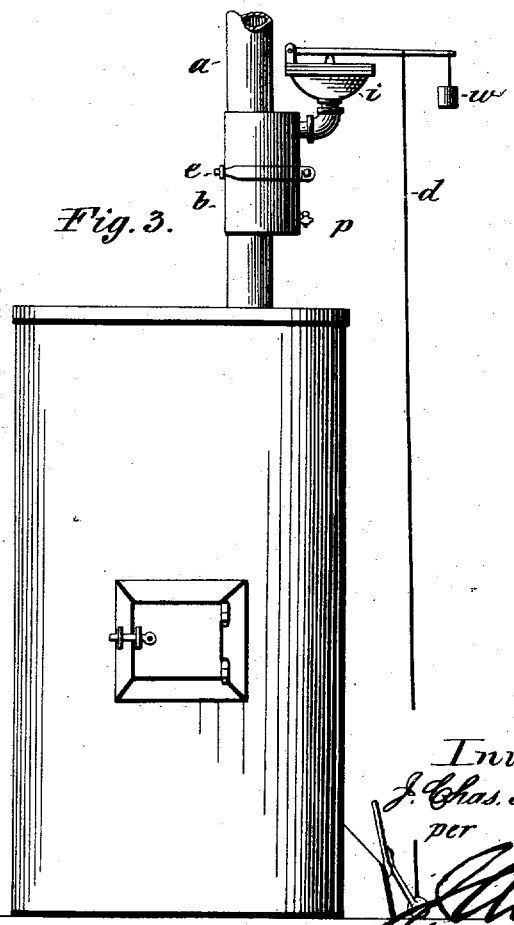
Fig. 3.
Witnesses:
Arthur Ashley
James F. Duhamel
Inventor
J. Chas. F. Atsatt
per
J. A. Ashley
Atty.
THE NORRIS PETERS CO., PHOTO-LITHO., WASHINGTON, D. C.

UNITED STATES PATENT OFFICE.

JOHN CHARLES F. ATSATT, OF MATTAPOISETT, MASSACHUSETTS.

DEVICE FOR AUTOMATICALLY REGULATING COMBUSTION IN HOT-WATER AND HOT-AIR HEATING APPARATUS.

SPECIFICATION forming part of Reissued Letters Patent No. 11,139, dated January 13, 1891.

Original No. 406,018, dated July 2, 1889. Application for reissue filed December 9, 1889. Serial No. 333,156.

*To all whom it may concern:*

Be it known that I, JOHN CHARLES F. ATSATT, a citizen of the United States, residing at Mattapoisett, in the county of Plymouth and State of Massachusetts, have invented certain new and useful Improvements in Devices for Automatically Regulating Combustion in Hot-Water and Hot-Air Heating Apparatus, of which the following is a specification.

The object of my invention is to provide an automatic regulator of combustion in heating apparatus which will be sensitive to slight changes of temperature, simple and durable in its construction, easily and quickly applicable to the heating apparatus, and which can be afforded to the consumer at a comparatively slight expense.

To this end my invention consists in an air-chamber adapted to be clamped or otherwise attached to a hot-water or hot-air heating apparatus and provided with a flexible diaphragm and mechanism between said diaphragm and the damper or draft-opening of said heating apparatus, whereby the expansion and contraction of the air in said chamber are caused to regulate said damper or draft-opening.

My invention further consists in an air-chamber which is adapted to be clamped or otherwise detachably applied exteriorly to a vertical surface of a heating apparatus, and which is provided with a flexible diaphragm and with mechanism between said diaphragm and a damper or a draft-door of said heating apparatus, whereby the expansion and contraction of the air in said chamber operate to move said damper or door and thereby regulate the dimensions of its draft-opening.

In the accompanying drawings, Figure 1 represents an elevation of my regulating apparatus applied to the smoke-exit pipe of a heating apparatus. Fig. 2 is a view in central vertical section of the air-chamber detached. Fig. 3 represents an elevation of a heating apparatus having my draft-regulating mechanism applied thereto.

Referring further to the drawings, *b* represents a chamber for containing air and which may be of any convenient form to best adapt it for application to a vertical surface of the heating apparatus. In this instance it has a concave side to fit the curvature of the circular pipe to which it is applied.

As seen in Figs. 1 and 3, *a* designates a portion of the main pipe of a hot-water heating apparatus, to which the air-chamber *b* is detachably secured by means of a clamp *e*. The chamber *b* is in this instance provided with a stop-cock *p* in order that, if desired, it may be charged with more than one atmosphere. The chamber *b* is provided, also, with a flexible diaphragm *h*, here shown as secured to and making an air-tight joint with the top or mouth of a broad and somewhat shallow bowl *i*. The top of the bowl is provided at one side thereof with a standard *f*, to which is pivoted one end of a lever *l*, the other end being provided with weights *w*. A pillar *g* rests on the diaphragm *h*, with its top bearing against the under surface of the lever *l*, while a wire *d* connects the lever *l* with a damper or draft-door of the heating apparatus.

The operation is as follows: The air-chamber *b*, with its attachments, is clamped or otherwise detachably applied to some convenient exterior vertical part of the heating apparatus in such a manner that a considerable portion of its surface shall be in close contact with such vertical surface of the heating apparatus, and the lever *l* is connected with the damper or draft-door of such apparatus. When the temperature of the heating apparatus has risen to a certain degree, the air in the chamber *b* will have expanded sufficiently to force the diaphragm outward, and thus by means of the intermediate mechanism partially close the damper or door of the draft-opening. If it be desired to regulate the temperature of the heating apparatus to a lower degree, a part or all of the weight *w* will be removed from the end of the lever *l*, when, as is obvious, a less expansive force of the air in the chamber will cause the damper or door of the draft-opening to be regulated. If it be desired to regulate the temperature to a still lower degree, the chamber *b* will be charged through the stop-cock *p* with more than one atmosphere, when a very moderate degree of heat will cause the dense air within the chamber to expand sufficiently to move the diaphragm outwardly and thus diminish the draft.

It will be apparent that through the provision in the air-chamber of a means for condensing the air therein the regulating apparatus is rendered extremely sensitive to even very slight variations in temperature.

The invention having been thus described, what is claimed is—

1. In an apparatus for heating a detachable air-chamber adapted to conform to a vertical exterior heated surface of the apparatus and provided with a flexible diaphragm and with an air-injection opening which has a cut-off, a damper or draft-door which is adapted to close an air-inlet opening, and mechanism actuated by the diaphragm connecting the air-chamber and the damper or draft-door and operating to vary the volumn of air admitted to the inlet-opening, in combination, substantially as shown.

2. A device for automatically regulating combustion in heating apparatus, consisting of the air-chamber *b*, having one of its sides concave to conform to the convex surface of the main pipe of said apparatus and adapted to be clamped thereto and provided with the cock *p*, in combination with the bowl *i*, connected with said air-chamber and provided with flexible diaphragm *h*, and mechanism between said diaphragm and the damper or draft-opening of said heating apparatus, whereby the expansion and contraction of the air in said air-chamber closes or opens said damper or draft-opening, all as shown and described.

3. A device for automatically regulating combustion in heating apparatus, consisting of the detachable air-chamber *b*, conformed to the surface of the vertical main pipe of said apparatus and adapted to be applied thereto and provided with flexible diaphragm *h*, and with mechanism between said diaphragm and the damper or door of the draft-opening of said heating apparatus, whereby the expansion and contraction of the air in said air-chamber closes or opens said draft-opening.

4. A device for the automatic regulation of combustion, which embraces an air-chamber which is provided with a closable air-injecting pipe, with a flexible diaphragm, and with a weighted lever which bears upon such diaphragm, and is connected with a draft-door or damper, whereby combustion is made regulable by varying the pressure upon the diaphragm either from within outwardly or from without inwardly.

5. A device for the automatic regulation of combustion in heating apparatus, which is conformed and adapted to be detachably attached to an exterior vertical heated surface of such apparatus, and which embraces an air-chamber which is provided with a closable air-injecting pipe, with a flexible diaphragm, and with a weighted lever which bears upon such diaphragm and which has a connection with a draft-door or damper, whereby a regulable pressure is brought to bear upon either surface of the diaphragm.

6. The described portable air-chamber *b*, having the flexible diaphragm *h*, the air-injecting pipe or stop-cock *p* for condensing air within the chamber, and the variably-weighted lever *l* for regulating the downward pressure upon the diaphragm.

J. CHAS. F. ATSATT.

Witnesses:

NOAH HAMMOND,

MARTHA M. HAMMOND.